(12) United States Patent
Sakai et al.

(10) Patent No.: US 11,494,906 B2
(45) Date of Patent: Nov. 8, 2022

(54) OBJECT DETECTION DEVICE, OBJECT DETECTION METHOD, AND PROGRAM

(71) Applicant: OMRON Corporation, Kyoto (JP)

(72) Inventors: Shun Sakai, Kusatsu (JP); Masahiko Ogawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 144 days.

(21) Appl. No.: 16/970,689

(22) PCT Filed: Jan. 18, 2019

(86) PCT No.: PCT/JP2019/001487
§ 371 (c)(1),
(2) Date: Aug. 18, 2020

(87) PCT Pub. No.: WO2019/171779
PCT Pub. Date: Sep. 12, 2019

(65) Prior Publication Data
US 2020/0394797 A1    Dec. 17, 2020

(30) Foreign Application Priority Data

Mar. 7, 2018    (JP) .............................. JP2018-040927

(51) Int. Cl.
*G06T 7/00*       (2017.01)
*G06T 7/254*      (2017.01)
(52) U.S. Cl.
CPC ............ *G06T 7/0012* (2013.01); *G06T 7/254* (2017.01); *G06T 2207/20224* (2013.01); *G06T 2207/30201* (2013.01)
(58) Field of Classification Search
CPC ... G06F 3/04842; G06T 7/0012; G06T 7/254; G06T 2207/10016; G06T 2207/20224; G06T 2207/30201
See application file for complete search history.

(56) References Cited

U.S. PATENT DOCUMENTS 6,940,545 B1 * 9/2005 Ray ..................... H04N 5/23222
                                                348/222.1
7,801,337 B2 * 9/2010 Akahori ............... G06V 10/806
                                                382/118

(Continued)

FOREIGN PATENT DOCUMENTS

JP    2007-133840 A    5/2007
JP    2008-102611 A    5/2008

(Continued)

OTHER PUBLICATIONS

English translation of the International Search Report ("ISR") of PCT/JP2019/001487 dated Apr. 16, 2019.

(Continued)

*Primary Examiner* — Vu Le
*Assistant Examiner* — Julius Chai
(74) *Attorney, Agent, or Firm* — Metrolex IP Law Group, PLLC

(57) ABSTRACT

An object detection device for detecting a target object from an image, includes: a first detection unit configured to detect a plurality of candidate regions in which the target object exists from the image; a region integration unit configured to determine one or more integrated regions based on the plurality of candidate regions detected by the first detection unit; a selection unit configured to select at least a part of the integrated regions; and a second detection unit configured to detect the target object from the selected integrated region using a detection algorithm different from a detection algorithm used by the first detection unit.

16 Claims, 11 Drawing Sheets

(56) References Cited

U.S. PATENT DOCUMENTS

| | | | | |
|---|---|---|---|---|
| 2004/0091153 A1* | 5/2004 | Nakano | ............... | G06V 40/10 |
| | | | | 382/190 |
| 2005/0147278 A1* | 7/2005 | Rui | ............... | G06T 7/251 |
| | | | | 382/118 |
| 2007/0031041 A1* | 2/2007 | Ko | ............... | G06V 40/162 |
| | | | | 382/190 |
| 2010/0296701 A1* | 11/2010 | Hu | ............... | G06V 40/173 |
| | | | | 382/103 |
| 2011/0050939 A1* | 3/2011 | Tsurumi | ............... | H04N 5/23219 |
| | | | | 348/222.1 |
| 2011/0241991 A1* | 10/2011 | Ogura | ............... | G06V 40/176 |
| | | | | 345/158 |
| 2012/0057748 A1* | 3/2012 | Katano | ............... | G06T 7/248 |
| | | | | 382/103 |
| 2013/0286218 A1* | 10/2013 | Tsuji | ............... | H04N 5/23296 |
| | | | | 348/169 |
| 2014/0104313 A1* | 4/2014 | Matsumoto | ............... | G06T 7/73 |
| | | | | 345/632 |
| 2014/0348434 A1* | 11/2014 | Xu | ............... | G06V 10/955 |
| | | | | 382/228 |
| 2015/0092078 A1* | 4/2015 | Corcoran | ............... | G06T 7/248 |
| | | | | 348/222.1 |
| 2016/0260226 A1* | 9/2016 | Yano | ............... | G06V 20/52 |
| 2016/0335780 A1* | 11/2016 | Tsuji | ............... | G06T 7/248 |
| 2017/0011523 A1* | 1/2017 | Magai | ............... | G06K 9/6262 |
| 2019/0130580 A1* | 5/2019 | Chen | ............... | G06V 20/40 |

FOREIGN PATENT DOCUMENTS

| | | |
|---|---|---|
| JP | 2012-118634 A | 6/2012 |
| JP | 2015-536517 A | 12/2015 |
| JP | 2016-162232 A | 9/2016 |

OTHER PUBLICATIONS

The Written Opinion("WO") of PCT/JP2019/001487 dated Apr. 16, 2019.

* cited by examiner

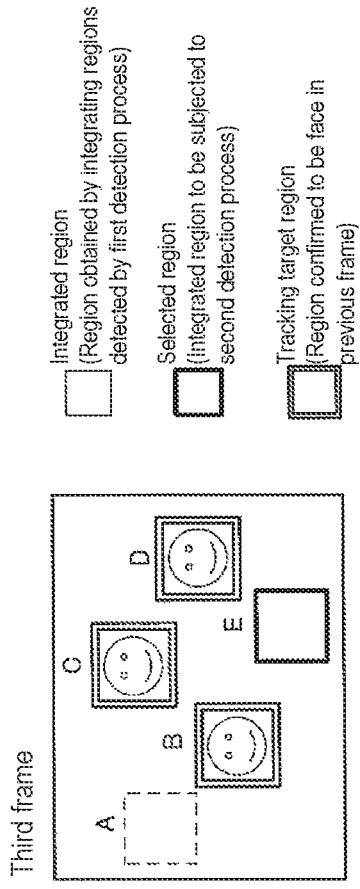
Fig. 11A First frame
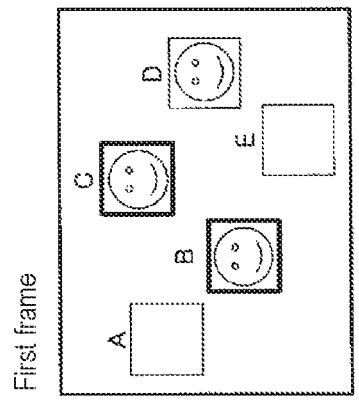
Fig. 11B Second frame
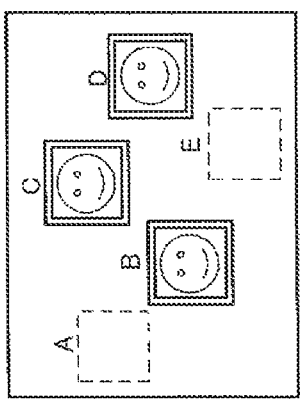
Fig. 11C Third frame
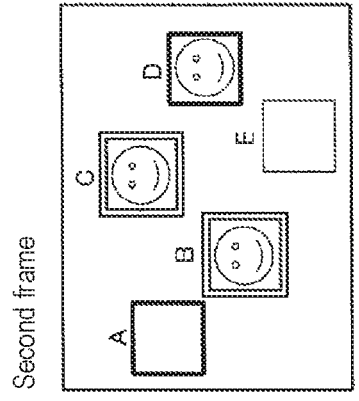
Fig. 11D Fourth frame Regions B and C are detected as face regions

OBJECT DETECTION DEVICE, OBJECT DETECTION METHOD, AND PROGRAM

TECHNICAL FIELD

The present invention relates to a technique for detecting an object from an image.

BACKGROUND ART

Conventionally, there is known a technique for detecting a predetermined object such as a human face from an image (Patent Documents 1 and 2). In recent years, with the advent of deep learning, the accuracy of image detection has dramatically improved. However, deep learning requires much more calculation amount than conventional methods.

Since the calculation load of deep learning is high as described above, deep learning is considered to be unsuitable for embedded devices such as mobile devices. Even considering recent technological innovations, it is not easy to execute deep learning algorithms in embedded devices. In consideration of such a situation, there is a demand for a fast and highly accurate object detection algorithm that can be operated even in a device having a small calculating resource such as an embedded device.

PRIOR ART DOCUMENTS

Patent Documents

Patent Document 1: Japanese Unexamined Patent Publication No. 2007-133840
Patent Document 2: Japanese Unexamined Patent Publication No. 2008-102611

SUMMARY OF THE INVENTION

Problems to be Solved by the Invention

In order to perform fast and highly accurate object detection even in a device having a small calculating resources, it is conceivable to first, perform detection using an algorithm requiring a low calculation load (low-load algorithm), and then perform detection only on the detected region using an algorithm that requires a high calculation load but that is accurate (highly accurate algorithm) such as deep learning. At this time, as a measure against many regions being detected in the detection using the low-load algorithm, it is also conceivable to integrate the plurality of regions and perform detection on the region after the integration using a highly accurate algorithm. According to such a method, it is possible to perform detection that is accurate almost the same as detection using only a highly accurate algorithm but that is faster than that.

However, when a large number of detection target objects are included in an image, the number of integrated regions is large, and thus sufficient speedup is not achievable. For example, when face detection is performed on a group photo, the number of integrated regions is equal to or more than the number of persons in the image, and thus detection on all of the integrated regions using a highly accurate algorithm results in a large amount of calculation time.

In consideration of such difficulty, the present invention is directed to provide a technique capable of detecting an object at high speed and with high accuracy.

Means for Solving the Problem

The present invention includes a first detection unit and a second detection unit configured to detect a predetermined object from an image using different detection algorithms, integrates candidate regions detected by the first detection unit, and performs object detection by the second detection unit only on candidate regions selected from candidate regions after the integration. The target object may be any object, and examples thereof include a human body part such as a human face and body, an animal or a part thereof, an automobile, and a product.

More specifically, an object detection device according to one aspect of the present invention is an object detection device for detecting a target object from an image, and includes a first detection unit, a second detection unit, a region integration unit, and a selection unit. The first detection unit and the second detection unit are both configured to detect a predetermined target object from an image, but detection algorithms used by them are different. Here, the detection algorithm of the second detection unit may be a detection algorithm that is more accurate than that of the first detection unit, but requires a larger calculation amount.

The first detection unit is configured to detect, from the image, a plurality of candidate regions in which it is estimated that a target object exists. The region integration unit is configured to determine one or more integrated regions based on the plurality of candidate regions. The selection unit selects at least a part of the integrated regions determined by the region integration unit. The second detection unit is configured to perform object detection on the integrated region selected by the selection unit.

With such a configuration, object detection by the second detection unit can be performed only on integrated regions, so that speedup of the process can be achieved and detection accuracy of the second detector can also be kept. In particular, since the number of integrated regions to be processed by the second detection unit is narrowed down by the selection unit, it is possible to suppress a decrease in processing speed even when a large number of target objects are included in an image and therefore a large number of integrated regions are determined. That is, according to the object detection device of the present invention, fast and highly accurate object recognition can be achieved.

The object detection device according to the present aspect further including a tracking unit configured to track a target object can be preferably used when a target object is detected from a moving image. That is, the object detection device may be configured to track, by using the tracking unit, an object or a region having been confirmed to be a target object by the previous frame, and perform detection on the other regions using the first detection unit, the region integration unit, the selection unit, and the second detection unit. Here, the "an object (a region) having been confirmed to be a target object by the previous frame" includes both an object (a region) detected as a target object by the second detection unit in the process performed on the previous frame and an object (a region) detected by the tracking unit.

In this case, the tracking unit may perform, in the current frame, the tracking process on the object having been confirmed to be a target object in the previous frame. The selection unit may be configured to select at least a part of the integrated regions at positions other than a region confirmed to be the target object in the previous frame. With this configuration, even if the number of faces to be newly detected using the second detection unit in each frame is limited, face detection can be performed by the tracking unit. Therefore, even if a large number of target objects exist in an image, the number of objects detected as target objects by the second detection unit increases if there is no change in the composition, and it is expected that all target objects are tracked by the tracking unit in a few frames. In addition, since integrated regions to be processed by the second detection unit in each frame are limited, it is possible to prevent the calculation amount in each frame from becoming excessive.

The selection criterion of the selection unit is not particularly limited as long as the selection unit is configured to select a predetermined or smaller number of integrated regions. For example, the selection unit may select a predetermined number of integrated regions having a reliability equal to or more than a threshold from integrated regions at positions other than the region confirmed to be the target object in the previous frame. The reliability here is a value related to the probability that a target object is included in the integrated region. Further, the selection unit may select a predetermined number of integrated regions having larger sizes from integrated regions at positions other than the region confirmed to be the target object in the previous frame. In addition to the reliability and size, an attribute of a target object included in the integrated region (for example, age, gender, and the like if the object is a person) may be considered, or the number of candidate regions having been integrated into the integrated region may be considered. In addition, a plurality of criteria may be combined and integrated regions may be selected according to the criteria. Further, in a case where detection has been performed by the second detection unit in the previous frame, the reliability thereof may be taken into consideration. For example, the selection unit may be configured not to select an integrated region, the reliability of the detection of which by the second detection unit in the previous frame is low or lower the selection priority thereof in the current frame. The selection unit does not always have to select a "predetermined number" of integrated regions, and may select only integrated regions that satisfy the condition if a predetermined number of integrated regions satisfying the condition do not exist.

In the present aspect, the selection unit may select an integrated region in consideration of a detection score by the second detection unit in a previous frame. There may be a region for which the detection score (reliability) is calculated to be high by the first detection unit, but the detection score is calculated to be low by the second detection unit. In such a case, selection considering the detection score by the second detection unit in the previous frame enables prevention of the same integrated region from being selected. It should be noted that the detection score in not only the latest one frame but also detection scores in earlier previous frames may be considered. In this case, it is preferable to consider the detection scores by weighting them according to time. The selection may be performed by further considering the degree of similarity of regions between frames.

In the present aspect, the selection unit may be configured to finally select "at least a part of the integrated regions at positions other than a region confirmed to be the target object in the previous frame". One method for achieving this is to prevent an "integrated region at a position of a region confirmed to be the target object in the previous frame" from being included in integrated regions input to the selection unit. Another method is that the selection unit excludes the "integrated region at a position of a region confirmed to be the target object in the previous frame" from the input integrated regions.

In order to achieve the former method, the object detection device according to the present aspect may further include a preprocessing unit configured to perform a preprocess on a region in a current frame image corresponding to a region of an object confirmed to be the target object in a previous frame, and the process causes the region not to be detected as the object. As an example of such a preprocess, it is conceivable to replace the region with a predetermined pattern (for example, a single color-filled pattern). As another example, a filtering process is also conceivable, but it is preferable that the processing load be as small as possible. By performing such a preprocess, an object is not detected by the first detection unit from a region that has been confirmed to be the target object in the previous frame, and thus integrated regions input to the selection unit do not include the above-described region.

In order to achieve the latter method, the object detection device according to the present aspect may further include a memory unit that stores a position of the region confirmed to be the target object in the previous frame image. By referring to such a memory unit, the selection unit can exclude integrated regions at positions stored in the memory unit from the selection target.

The specific process contents of the region integration unit are not particularly limited as long as the region integration unit integrates candidate regions detected by the first detection unit. The region integration unit may determine a representative region from candidate regions and then integrate other regions within a predetermined distance from the representative region with the representative region. By using the detection score or the region size as a criterion when the representative region is determined, the probability that a target object exists in the integrated region can be increased. By considering the degree of similarity of the region sizes and the degree of similarity of the attributes of the target objects in integration, the integration can be performed such that only one target object is included in one integrated region.

The present invention can be regarded as an object detection device including at least a part of the above-described units. In addition, the present invention can be regarded as an object detection method. Furthermore, the present invention can be regarded as a computer program for causing a computer to perform the steps of the method, and a computer-readable storage medium that stores the program non-temporarily. The above-described components and processes can be combined with each other to configure the present invention as long as no technical contradiction occurs.

Effect of the Invention

According to the present invention, fast and highly accurate object detection is possible, and the invention can be used even in a computer having small calculating resources.

BRIEF DESCRIPTION OF THE DRAWINGS

FIGS. 11A to 11D are diagrams illustrating the face detection process performed by the face detection device according to the first embodiment.

MODE FOR CARRYING OUT THE INVENTION

Application Example

An object to be detected by an object detection device of the present invention may be any object, but an application example applied to face detection will be described here. The following detection method is conceivable in a face detection device having a first face detector using Haar-like features and Adaboost and a second face detector using deep learning. First, the first face detector performs detection on the entire input image to determine a region where a face is likely to exist (face candidate region). Since a large number of face candidate regions are detected by the first face detector, a plurality of regions corresponding to the same face is integrated, and the second face detector performs face detection only on the integrated region. As a result, highly accurate face detection using deep learning can be realized in a short time. However, when the input image includes a large number of persons, the number of integrated regions is large, and thus sufficient speedup is not achievable.

Figure 1:
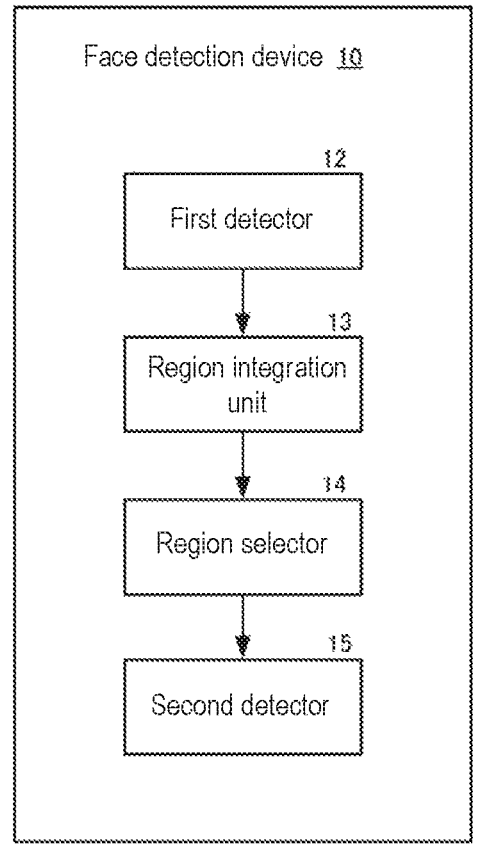
FIG. 1 is a block diagram illustrating a configuration of an application example of the present invention.

FIG. 1 is a block diagram illustrating a configuration of a face detection device 10 to which the present invention is applied. The face detection device 10 includes a first detector 12, a region integration unit 13, a region selector 14, and a second detector 15. Each of these units may be implemented by a CPU executing a program, or may be implemented by a dedicated logic circuit such as an ASIC.

An image input unit 11 acquires image data to be a face detection target. The input image may be a still image or a moving image.

The first detector 12 performs face detection using a relatively fast and low-load algorithm. For example, an algorithm using Haar-like features and Adaboost can be used. A region where a face is estimated to exist by a first detector 112 is hereinafter referred to as a face candidate region. The first detector 112 typically detects a plurality of face candidate regions around one face. The first detector 112 is an example of the first detection unit of the present invention. The first detector 12 can use, for example, any feature such as Histgram of Gradient (HoG) feature, SIFT feature, and SURF feature as the feature. Further, as a learning method, any learning method such as a boosting method other than Adaboost, a Support Vector Machine (SVM), neural network, or decision tree learning can be used.

A region integration unit 113 integrates face candidate regions detected by the first detector 112. Since the first detector 112 detects a plurality of face candidate regions around one face as described above, the region integration unit 113 integrates a plurality of face candidate regions estimated to correspond to one face to generate an integrated region. The region integration unit 113 is an example of the region integration unit of the present invention.

A region selector 114 selects an integrated region to be a target of the process by the second detector 115 from the integrated region determined by the region integration unit 113. An upper limit may be set for the number of integrated regions selected by the region selector 114. According to a predetermined criterion, the region selector 114 selects a predetermined (or smaller) number of integrated regions with higher degrees of satisfaction to the criterion. As a predetermined criterion, a detection score (reliability) of detection by the first detector 112, the size of the integrated region, the attributes (age, gender, and the like) of the face (person) included in the integrated region, and the like can be used. The region selector 114 is an example of the selection unit of the present invention.

A second detector 115 performs face detection using a relatively highly accurate but slow algorithm. For example, an algorithm using deep learning such as Convolutional Neural Network (CNN) can be used. Face detection is performed on an integrated region selected by the second detector 115 and the region selector 114. The second detector 115 is an example of the second detection unit of the present invention. The algorithm of the second detector 15 is not limited to CNN, but any method such as Recurrent Neural Network (RNN), Stacked Auto Encoder (SAE), and Deep Belief Network (DBN) can be used.

According to the above-described configuration of the face detection device 10, the number of integrated regions to be targets of detection by the second detector 15 is limited. Thus, even when a large number of faces exist in an input image, fast and highly accurate face detection is possible.

The face detection device 10 has a limitation that the maximum number of faces that can be detected from one image (frame image) is a predetermined number, but by applying a face tracking process to a moving image in combination, all faces in a moving image can be detected. That is, the face detection device 10 tracks an already detected face by the face tracking process, and detects a new face by the first detector 12 and the second detector 15. Thus, a new face is detected in each frame by the second detector 15 and the face is used as a tracking target of the face tracking process, and finally, all faces in an image are used as tracking targets of the face tracking process while suppressing the calculation amount in each frame. Since the face tracking process is a low-load and sufficiently accurate process, such a configuration can detect all faces in a moving image with high accuracy while minimizing a decrease in processing speed.

First Embodiment

An embodiment described below relates to a face detection device (object detection device) that is mounted on a mobile information terminal such as a smartphone and that detects a face from a moving image. However, this is merely an example, and an object detected from an image need not be a face and may be any object. Further, the face detection device (object detection device) may be mounted on any information processing device (computer) in addition to the mobile information terminal.

The face detection device according to the embodiment is used for, for example, applications such as autofocus (AF), person counting, vehicle driver monitoring (driver monitoring), and person detection with a security camera installed in a place where a large number of persons exist.

Configuration

Figure 2:
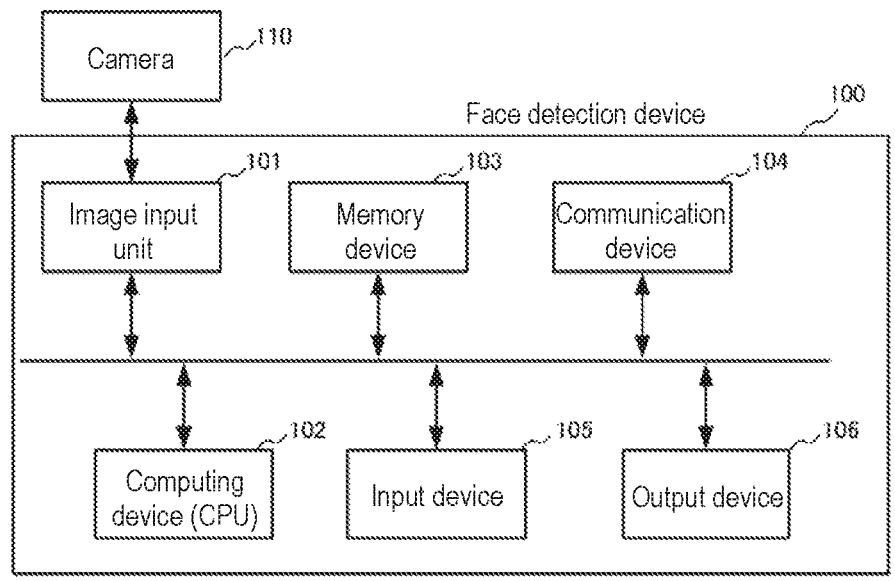
FIG. 2 is a diagram illustrating a hardware configuration of a face detection device according to a first embodiment.

FIG. 2 is a diagram illustrating a hardware configuration of a face detection device 100 according to the embodiment. The face detection device 100 includes an image input unit 101, a calculation device 102, a memory device 103, a communication device 104, an input device 105, and an output device 106. The image input unit 101 is an interface that receives image data from a camera 110. Although image data is received directly from the camera 110 in the embodiment, image data may be received via the communication device 104 or may be received via a recording medium. The calculation device 102 is a general-purpose processor such as a Central Processing Unit (CPU), and executes a program stored in the memory device 103 to perform processes to be described below. The memory device 103 includes a main memory device and an auxiliary memory device, stores a program executed by the calculation device 102, and stores image data and temporary data during program execution. The communication device 104 is a device for the face detection device 100 to communicate with an external computer. The communication mode may be wired or wireless and may conform to any communication standard. The input device 105 includes any one of a touch screen, a button, a keyboard, or the like, and is a device for a user to input an instruction to the face detection device. The output device 106 includes a display device, a speaker, or the like, and is a device for the face detection device to perform an output to a user.

Function and Process of Face Detection Device

Figure 3:
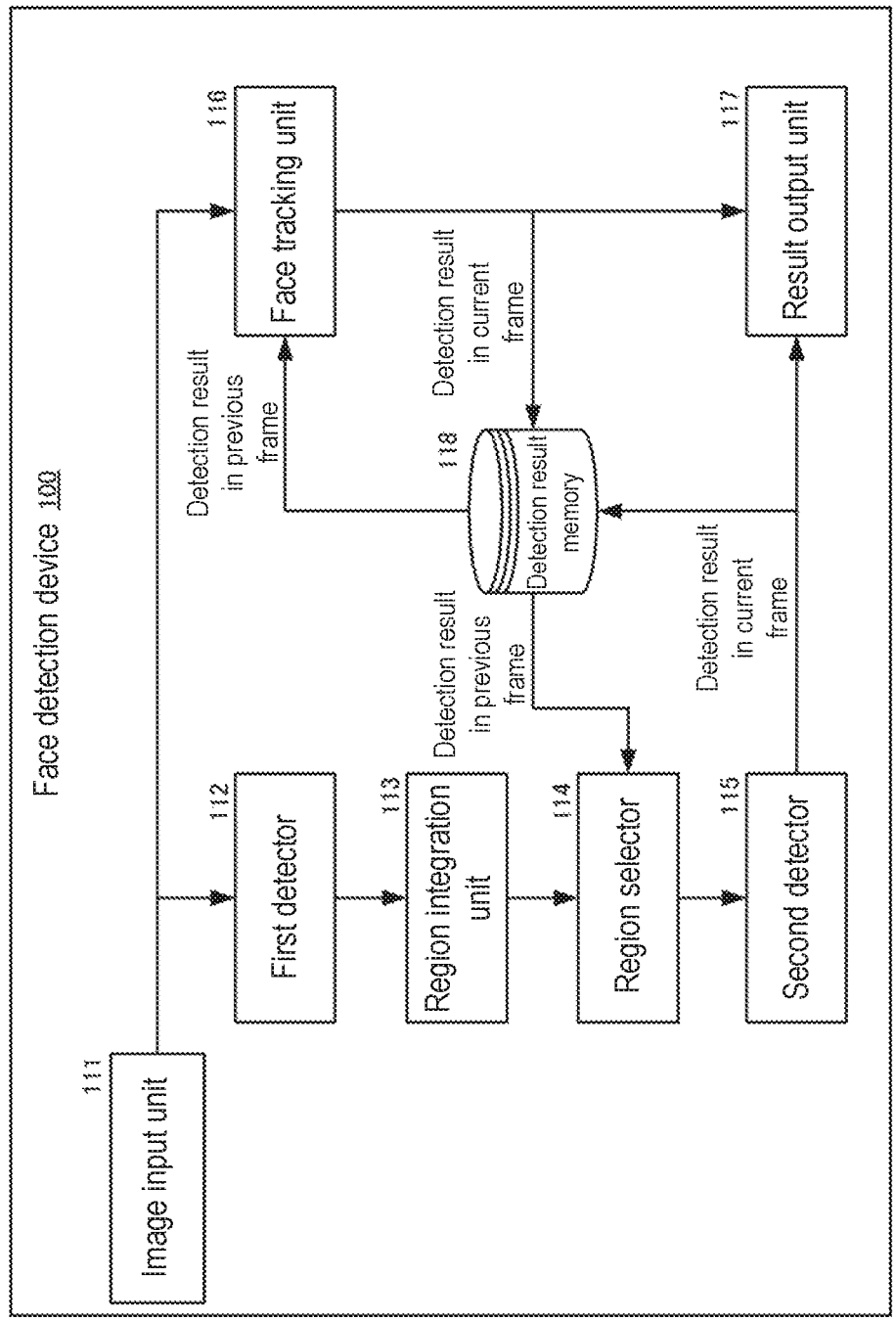
FIG. 3 is a block diagram illustrating a configuration of a face detection device according to the first embodiment.

The calculation device 102 executes a program to perform a process of each of units illustrated in FIG. 3. That is, the calculation device 102 performs processes performed by an image input unit 111, the first detector 112, the region integration unit 113, the region selector 114, the second detector 115, a face tracking unit 116, and a result output unit 117. The process contents of each unit will be described below.

Image Input Unit 111

The image input unit 111 acquires image data to be a face detection target. An image input in the embodiment is assumed to be a moving image, but the input image may be a still image. The input image may be acquired from the camera 20 via the image input unit 101, may be acquired from another computer via the communication device 104, or may be acquired from a storage medium via the memory device 103.

First Detector 112

The first detector 112 detects a face candidate region (region where a face is estimated to exist) from an input image. The first detector 112 is configured to be able to detect faces of various sizes and in various directions from an input image. The first detector 112 also estimates the certainty factor/face direction when detecting a face candidate region. The first detector 112 may estimate attributes such as gender, age, and race, perform face authentication, and use the results of these processes in later processes.

In the embodiment, the first detector 112 is configured to use Haar-like features as image features and AdaBoost as a learning algorithm. Hereinafter, the first detector 112 in the embodiment will be described with reference to FIGS. 4A and 4B.

Figure 4A:
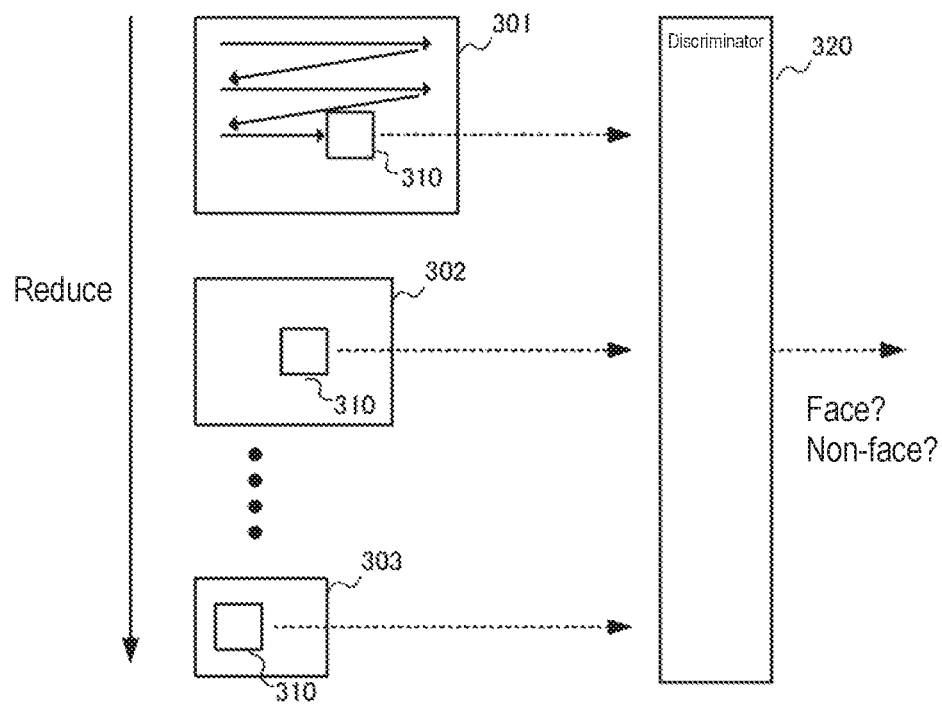
FIGS. 4A and 4B are views for describing a face detection process by a first detector 112.

As illustrated in FIG. 4A, in order to detect faces of various sizes, the first detector 112 cuts out a rectangular region 310 of a predetermined size each of reduced images 301 to 303 acquired by reducing an input image by a plurality of magnifications, and discriminates whether a face is included in the regions by using a discriminator 320. By scanning the rectangular region 310 in each of the reduced images 301 to 303, faces of various sizes included in the images can be detected. Although rectangular regions are cut out in the embodiment, the cut out region may be a region of any shape in addition to a rectangle.

Figure 4B:
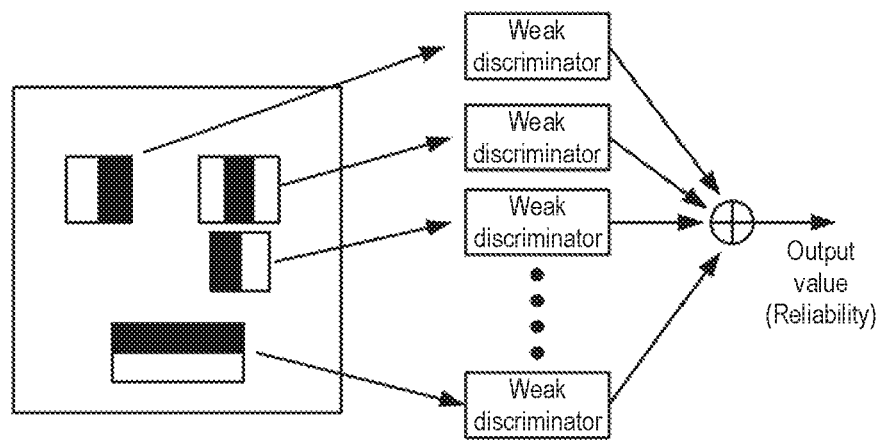

As illustrated in FIG. 4B, the discriminator 320 discriminates whether a matching pattern cut out by the rectangular region 310 is a face. The discriminator 320 extracts a feature (Haar-like feature) based on the light-dark relationship from each of a plurality of local regions in the matching pattern. The discriminator 320 has a plurality of weak discriminators, and each weak discriminator discriminates whether the matching pattern is a face based on a small number of features. Although the weak discriminators each have low discrimination performance, it is possible to discriminate whether it is a face with high accuracy by combining the plurality of weak discriminators. The discriminator 320 outputs, as an output value, the likelihood (reliability) that the matching pattern is a face pattern. Therefore, a region having a reliability equal to or more than a predetermined threshold is treated as a face candidate region.

Figure 5A:
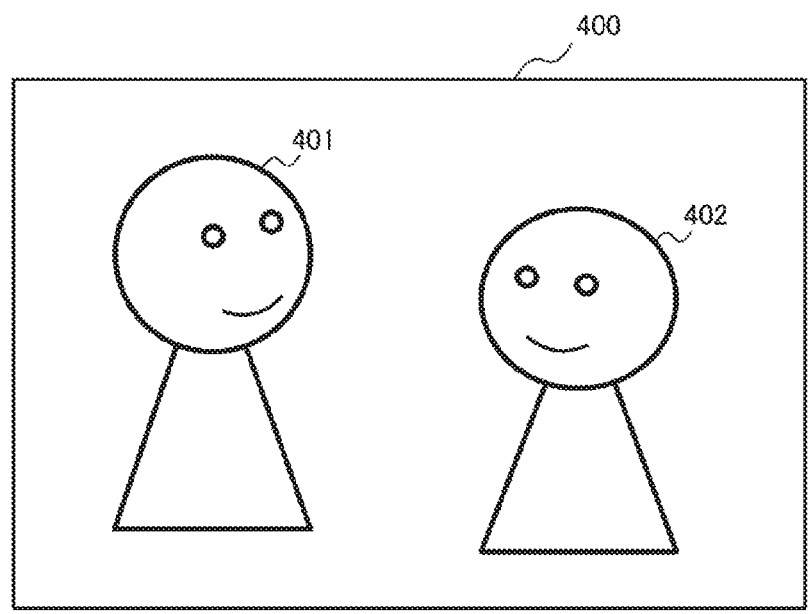
FIG. 5A and FIG. 5B are views for describing a face detection process by the first detector 112.

A specific example of the face detection process by the first detector 112 in step S2 will be described with reference to FIGS. 5A and 5B. FIG. 5A illustrates an input image 400. Persons 401 and 402 are in the input image 400. When the face detection process is performed on the input image 400 by the first detector 112, a plurality of face candidate regions is detected around the faces of the persons 401 and 402. This is because around a face, the matching patterns are determined to be faces even if the positions or sizes of the matching patterns slightly differ from each other.

Figure 5B:
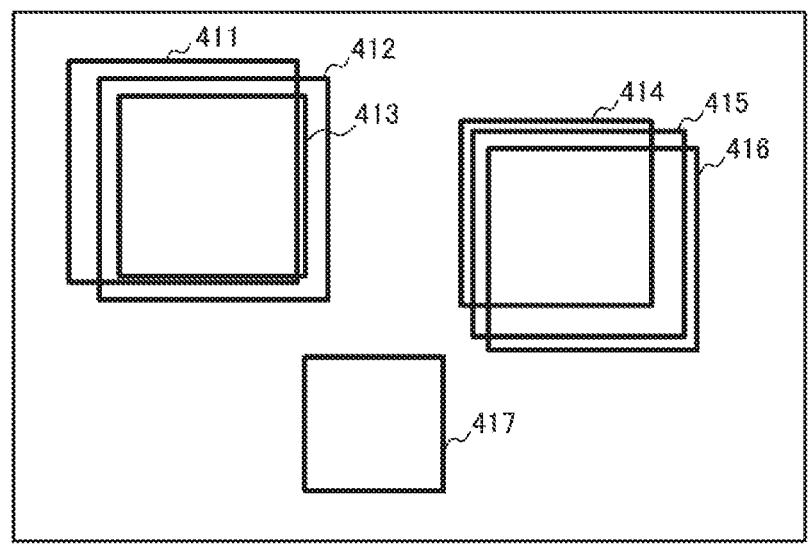

FIG. 5B illustrates an exemplary detection result for the input image 400. Three face candidate regions 411, 412, and 413 are detected around the face of the person 401, and three face candidate regions 414, 415, and 416 are detected around the face of the person 402. In addition, a face candidate region 417 is detected also from a region where no face actually exists. This is caused when the background pattern happens to resemble a face.

Region Integration Unit 113

Figure 6:
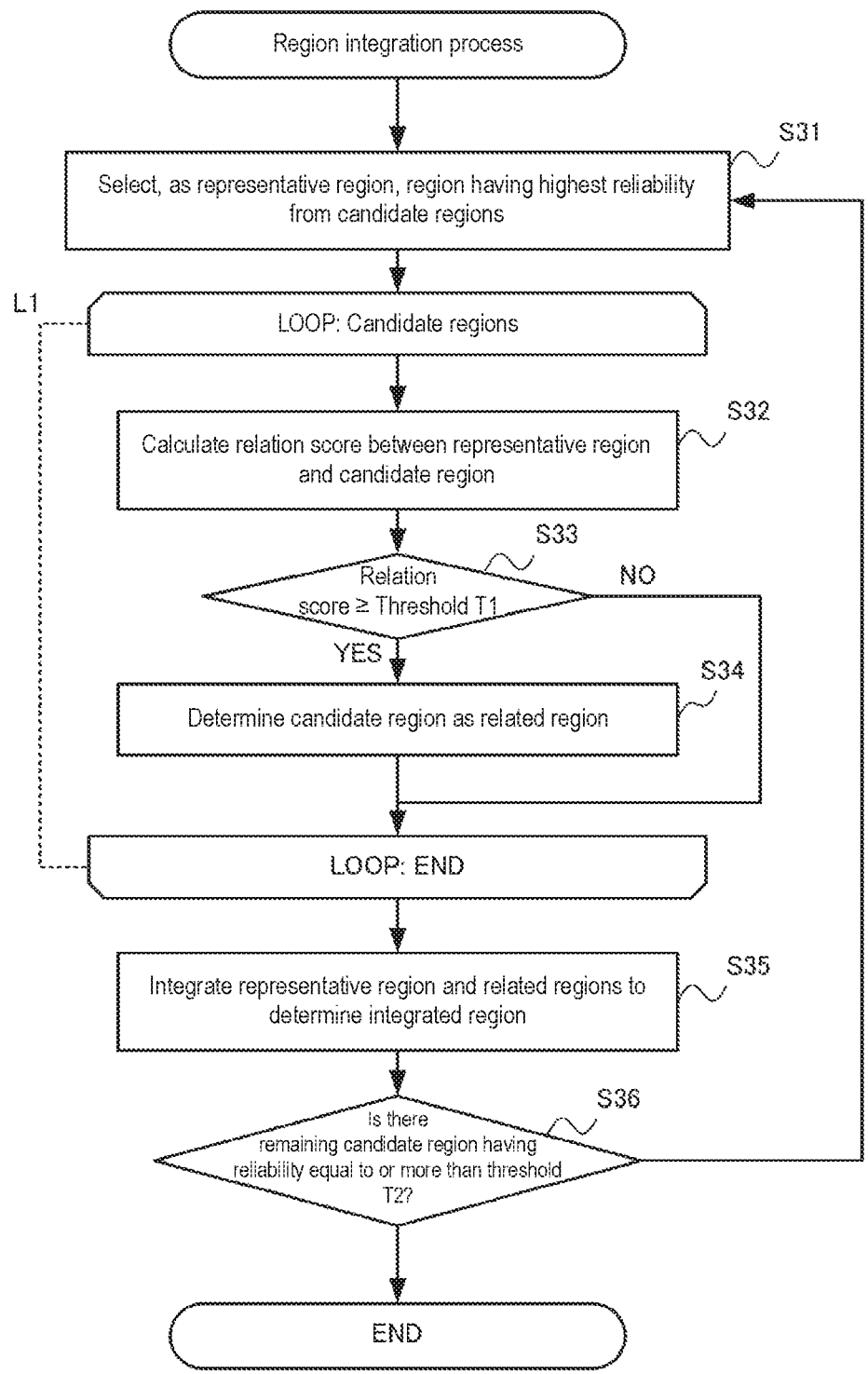
FIG. 6 is a flowchart illustrating a flow of a region integration process by a region selector 114.

The region integration unit 113 integrates a plurality of candidate regions detected by the first detector 112. The region integration unit 113 divides the plurality of candidate regions into groups, and determines one integrated region from the candidate regions of each group. FIG. 6 is a flowchart illustrating details of an integrated region determination process by the region integration unit 113. Hereinafter, description will be given according to the flowchart in FIG. 6.

In step S31, the region integration unit 113 selects, as a representative region, the one having the highest reliability from the plurality of candidate regions detected in step S2. The representative region need not be determined only based on the reliability, but may be determined in consideration of other information such as a region size and a face direction. When the region size is considered, a region having a larger size may be prioritized or a region having a size close to a predetermined size may be prioritized. A representative region may be determined based on the region size or other information without using the reliability.

A process loop L1 of steps S32 to S34 is performed on the plurality of detected candidate regions except for the representative region. Here, a candidate region to be a process target in the loop L1 is referred to as a candidate region of interest.

In step S32, the region integration unit 113 calculates a relation score between the representative region and the candidate region of interest. The relation score is a score indicating the likelihood that the representative region and the candidate region of interest are regions of the same face. The relation score can be calculated based on the distance between the regions (for example, the distance between the centers of the regions) and the size of the candidate region. For example, the closer the regions are, the larger the relation score is calculated. Further, the smaller the difference between the region sizes is, the larger the relation score is calculated.

The distance between the regions and the degree of similarity of the region sizes can be regarded as examples of the degree of similarity of the detection results by the first detector 112. The relation score may be determined based on the degree of similarity of other items of the detection result by the first detector 112. For example, the relation score may be calculated based on the degree of similarity of the detected face direction and the degree of similarity of the detected face attributes (for example, age, gender, race, and facial expression). When the relation score is determined in consideration of a plurality of elements, a function including the plurality of elements as variables may be used. Simply, the relation score may be determined by the average or weighted average of the degrees of similarity of elements. The weights in the weighted average may be determined as appropriately.

In step S33, the region integration unit 113 determines whether the relation score of the candidate region of interest is equal to or more than a threshold T1. When the relation score is equal to or more than the threshold T1 (S33—YES), in step S34, the region integration unit 113 determines that the candidate region of interest is a related region of the representative region. That is, the candidate region of interest is grouped into the same group as the representative region.

By performing the above steps S32 to S34 for all candidate regions, candidate regions related to the representative region can be determined.

Note that, here, candidate regions having relation scores equal to or more than the threshold T1 are determined as the related region, but a predetermined number of candidate regions having the highest relation score may be determined as the related regions. Alternatively, among candidate regions having relation scores equal to or more than the threshold T1, a predetermined number of candidate regions with higher relation scores may be determined as related regions.

In step S35, the region integration unit 113 integrates the representative region and its related regions to determine an integrated region. The method of determining the integrated region is not particularly limited. Here, two integrated region determination methods will be described with reference to FIGS. 7A and 7B.

Figure 7A:
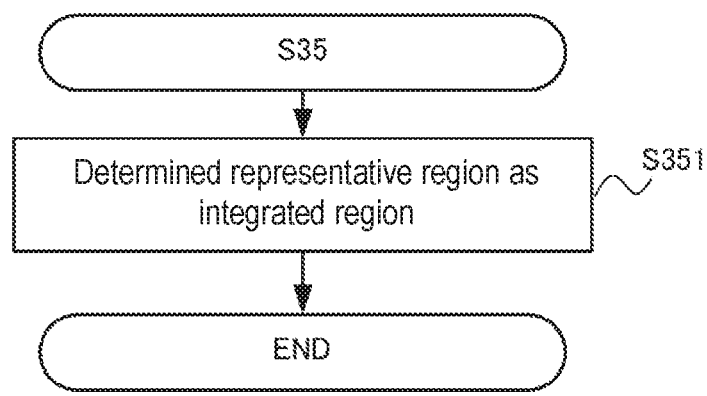
FIGS. 7A and 7B are flowcharts illustrating an example of integrated region determination in the region integration process.
Figure 7B:
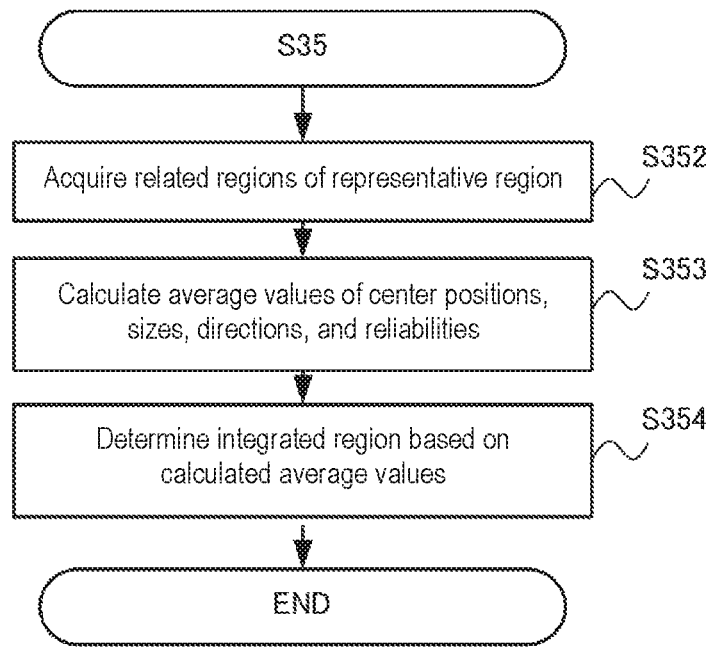

For example, as illustrated in FIG. 7A, in the integrated region determination process S35, the representative region itself may be determined as an integrated region (step S351). Alternatively, as illustrated in FIG. 7B, the integrated region determination process S35 may include the following steps. First, related regions that belong to the same group as the representative region is acquired (S352). Next, the average value of each parameter for determining the region is calculated for the representative region and the related regions (step S353). Finally, a region having the calculated average value as a parameter is determined as an integrated region (S354). Examples of the parameter include an average value of the centers of the regions and an average value of the region sizes. Other examples of the parameter include reliability, face direction, age, gender, race, facial expression, and the like.

In step S36, it is determined whether there remains a candidate region having a reliability that is equal to or more than a threshold T2. Specifically, it is determined whether there is a candidate region having a reliability that is equal to or more than the threshold T2 among candidate regions other than the regions determined as the representative region or the related regions among the candidate regions detected by the first detector 112. When there is a candidate region having a reliability that is equal to or more than a threshold T2, the processes return to step 331 and the above-described processes are repeated. At this time, the regions determined to be the representative region and the related regions are excluded from the process target, and then the processes of steps S31 to S35 are performed.

Figure 8:
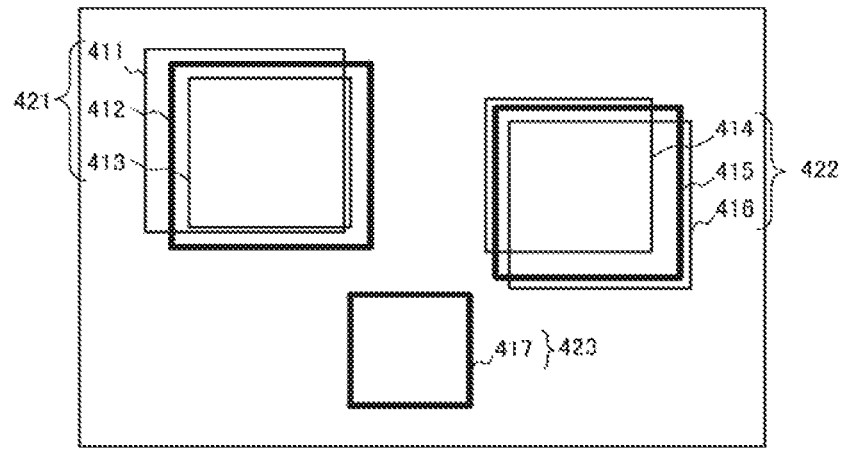
FIG. 8 is a diagram illustrating an example of the region integration process.

FIG. 8 is a diagram illustrating a process example in which the above-described integration process is performed on the detection result illustrated in FIG. 5B. Among the candidate regions 411 to 417, for example, the candidate regions 411, 415, and 417 are determined as representative regions. Then, an integrated region 421 formed from the candidate regions 411 to 413, an integrated region 422 formed from the candidate regions 414 to 416, and an integrated region 423 formed from only the candidate region 417 are determined.

Region Selector 114

The region selector 114 selects an integrated region to be a target of face detection by the second detector 115 from the plurality of integrated regions resulted from integration by the region integration unit 113. The region selector 114 selects an integrated region according to the following criterion.

(1) Do not select an integrated region at a position determined to be a face in the previous frame (2) Select a predetermined number of integrated regions with higher evaluation values among integrated regions other than those defined in (1).

Figure 9:
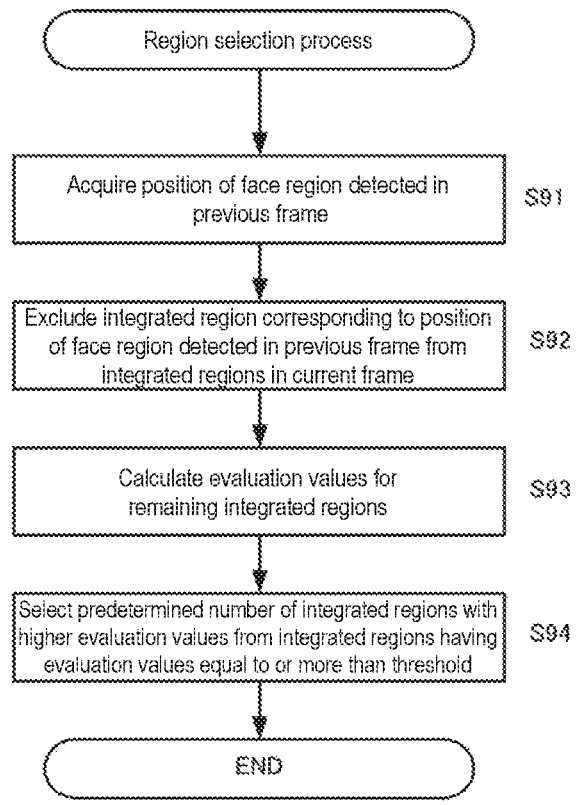
FIG. 9 is a flowchart illustrating a flow of the region selection process by the region selector 114.

A region selection process by the region selector 114 will be described with reference to the flowchart in FIG. 9

In step S91, the region selector 114 acquires the position of a face region detected in the previous frame. The final face detection result in each frame is acquired by the second detector 115 or the face tracking unit 116, and information such as the position, size, reliability, attribute of the detected face region is stored in the detection result memory 118. The region selector 114 can grasp the position of the face region detected in the previous frame by referring to the detection result memory 118.

In step S92, the region selector 114 compares the position of the integrated region in the current frame with the position of the face region in the previous frame to exclude the integrated region at the position determined to be the face in the previous frame from selection targets. In addition, not only the position but also the region size, the degree of similarity of images in the region, and the like may be taken into consideration for determination whether the integrated region of the current frame matches the face region of the previous frame.

In step S93, the region selector 114 calculates evaluation values for integrated regions remaining after step S92. The evaluation value of the integrated region is a value calculated to be higher as the probability that a face is included in the integrated region is higher. As an example of the evaluation value, the reliability of the integrated region can be used. The reliability of the integrated region can be determined based on the reliability (detection score) of the first detector 112 for each of the face candidate regions that form an integrated region. For example, the average value of the reliabilities of the first detector 112 can be used as the reliability of the integrated region. Further, the size of the integrated region may be used as the evaluation value of the integrated region, and the evaluation value may be set higher when the size is larger. This is because it is considered that the larger the region is, the higher the probability that the face is included. The direction of the target object in the integrated region may be used as the evaluation value of the integrated region. Although it is possible to appropriately set which direction the evaluation is to be made higher, it is conceivable that the evaluation value is made highest when the target object faces front, followed by diagonally, sideways, and backward in this order. The evaluation value may be determined in consideration of a plurality of items. For example, the evaluation value may be determined from an average (simple average or weighted average) of the first evaluation value based on the reliability and the second evaluation value based on the region size. Furthermore, when the detection process has been performed by the second detector 115 in the previous frame, the evaluation value may be determined in consideration of the detection reliability of the second detector 115.

In step S94, the region selector 114 selects a predetermined number of integrated regions with higher evaluation values. The predetermined number is determined as a value such that the face detection process finishes within one frame period. Therefore, the predetermined number is a parameter to be determined according to the amount of calculating resource of the face detection device 100. Furthermore, a condition that the evaluation value is equal to or more than the threshold may be added as a condition for selecting the integrated region. Thus, it is possible to prevent a region where the probability that a face exists is low from being a process target of the second detector 115. The threshold here is a value defined such that if the evaluation value of an integrated region is less than that, it may be considered that a face is not included in the integrated region.

Second Detector 115

The second detector 115 determines whether a face is included in each of the integrated regions selected by the region selector 114. The second detector 115 is a discriminator that has learned by using a multilayer neural network referred to as a convolutional neural network (CNN). By heterogeneous learning, it is possible to discriminate not only face/non-face but also a plurality of tasks such as face direction, age, gender, race, and facial expression. The second detector 115 of the embodiment also implements these discrimination tasks.

Information about the region detected as a face by the second detector 115 is stored in the detection result memory 118. Note that, information about the integrated region detected as not being a face by the second detector 115 may also be stored in the detection result memory 118.

Face Tracking Unit 116

The face tracking unit 116 detects, in the current frame, a face detected in the previous frame. The tracking process performed by the face tracking unit 116 can use any known tracking algorithm. The face tracking unit 116 detects the face only from a region around the face region detected in the previous frame. Since the tracking process is performed in this way, it can be performed fast. Information about the face region detected by the face tracking unit 116 is stored in the detection result memory 118.

Result Output Unit 117

The result output unit 117 outputs the detection result of face regions detected by the second detector 115 and the face tracking unit 116. The result output unit 117 outputs result information indicating that a face has been detected in the integrated region for which the reliability of the detection result is equal to or more than the threshold. An integrated region for which the reliability is less than the threshold does not have to be included in the result information. It is preferable that the detection result information include at least a face region, and in addition, include one or more of reliability, face direction, age, gender, race, facial expression, and the like.

The result output unit 117 may output the detection result information in any form. For example, the result output unit 117 may display the detection result information on a screen, may store it in a memory device, may notify other modules or other devices, or may output the detection result information in a plurality of these forms.

Detection Result Memory 118

The detection result memory 118 stores information such as the position, size, attribute, and the like of the face region detected by the second detector 115 and the face tracking unit 116. Furthermore, the detection result memory 118 may also store the reliability (detection score) of face detection for each of integrated regions having been subjected to the detection process by the second detector 115, including the integrated region determined not to include a face.

Process Flow

The face detection process in the embodiment will be described with reference to the flowchart in FIG. 10. It should be noted that this flowchart conceptually describes the face detection process in the embodiment, and the process need not be implemented as described with reference to the flowchart in the embodiment.

In step S1001, a frame image to be processed is acquired from moving image data acquired by the image input unit 111. Note that it is not necessary to use all frames of the moving image as targets of the face detection process, and the face detection process may be performed every few frames. Hereinafter, the frame image acquired in step S1001 will be referred to as a current frame image. The frame image that has been a process target until then is referred to as a previous frame image.

Next, in step S1002, the detection result for the previous frame image is acquired, and the region detected as a face region in the previous frame is grasped. In the current frame image, face detection is performed by the processes of steps S1003 to S1006 on regions having been determined not to be a face region in the previous frame. On the other hand, on regions having been determined to be face regions in the previous frame, face tracking is performed in step S1007.

Figure 10:
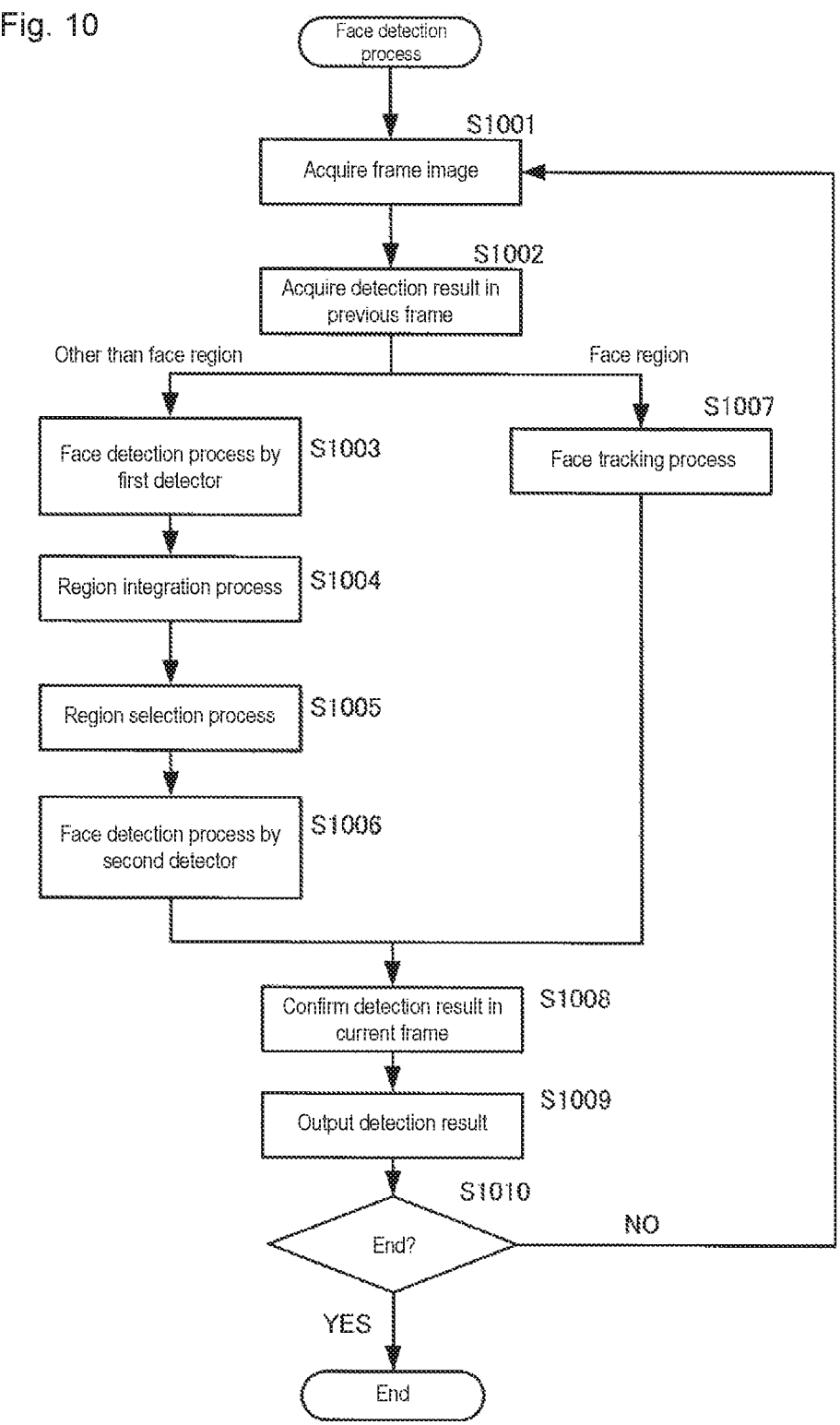
FIG. 10 is a flowchart illustrating a flow of the face detection process by the face detection device according to the first embodiment.

With reference to the flowchart in FIG. 10, it is described that the processes of steps S1003 to S1006 are performed on regions having been determined not to be a face region in the previous frame, but face regions detected in the previous frame may be subjected to the processes of steps S1003 to S1005 as long as they do not become process targets of second detection process of step S1006.

In step S1003, the first detector 112 performs a face detection process on the entire current frame image using a relatively low-load algorithm that uses Haar-like features and Adaboost. The face detection process by the first detector 112 is as described with reference to FIGS. 4 and 5.

Since the first detector 112 detects a plurality of face candidate regions around one face as described above, the region integration unit 113 integrates a plurality of face candidate regions estimated to correspond to one face to generate an integrated region in step S1004. The region integration process is as described with reference to FIGS. 6 and 7.

In step S1005, the region selector 114 selects a part from the integrated region resulted from integration in step S1004. As described above, the region selector 114 excludes the integrated region at the position determined to be the face in the previous frame, and selects a predetermined number of integrated regions with higher evaluation values. In the embodiment, in the region selection process, integrated regions corresponding to the face regions detected in the previous frame are excluded, so that regions other than the face regions detected in the previous frame are subjected to the process by the second detector 115.

In step S1006, the second detector 115 performs the face detection process using the deep learning algorithm on integrated regions selected in step S1005. The detection result by the second detector 115 is stored in the detection result memory 118.

In step S1007, the face tracking unit 116 performs the tracking process of faces detected in the previous frame and detects the positions in the current frame. The face tracking unit 116 stores the result of the tracking process in the detection result memory 118.

The result of adding the detection result of the second detector 115 and the tracking result of the face tracking unit 116 is the face detection result in the current frame. In step S1008, after the completion of both the detection process by the second detector 115 and the tracking process by the face tracking unit 116, the detection result for the current frame image is confirmed.

In step S1009, the result output unit 117 outputs a detection result. For example, an image acquired by superimposing a rectangle indicating a face region on a frame image is displayed on the output device 106 (display).

In step S1010, it is determined whether the face detection process ends. The end of the face detection may be explicitly commanded by a user, or the face detection may be ended at the time when the image input ends. When the face detection process is continued, the processes return to step S1001 and the same processes are repeated for the next frame.

An operation example when the face detection process according to the embodiment is applied to sequential frames will be described with reference to FIGS. 11A to 11D. Here, an example where an image including three persons is processed is described assuming that the number of the integration regions (predetermined number) selected by the region selector 114 is two.

FIG. 11A is a diagram illustrating a process on the first frame. Here, as a result of the processes by the first detector 112 and the region integration unit 113, five integrated regions A to E are acquired. When the first frame is processed, there is no already detected face, so all the integrated regions are candidates for the detection process using the second detector 115. Here, it is assumed that, as a result of the region selection by the region selector 114, the two integrated regions B and C with higher evaluation values are selected. The second detector 115 performs the face detection process using a deep learning algorithm on the integrated regions B and C, and detects faces from both of the integrated regions B and C. As a result, in the first frame, the integrated regions B and C are determined to be face regions.

FIG. 11B is a diagram illustrating a process for the second frame. This time, the faces existing in the regions B and C are the targets of the tracking process by the face tracking unit 116. The face tracking unit 116 detects faces from positions almost similar to those of the first frame.

Since it is assumed that there is no significant change in composition between frames, the results obtained by the first detector 112 and the region integration unit 113 are the same as those in the first frame, and the five integrated regions A to E are acquired. Here, since the regions B and C have been determined to be face regions in the first frame, they are not targets of selection by the region selector 114. It is assumed that the region selector 114 selects two integrated regions A and D with higher evaluation values from the regions A, D, and E. The second detector 115 performs the face detection process using a deep learning algorithm on the integrated regions A and D, and determines that the integrated region D is a face region, but the integrated region A is not a face region.

As a result of the above-described processes, in the second frame, the integrated regions B, C, and D are determined to be face regions.

FIG. 11C is a diagram illustrating a process for the third frame. This time, the faces existing in the regions B, C, and D are the targets of the tracking process by the face tracking unit 116. The face tracking unit 116 detects faces from positions almost similar to those of the second frame.

Since it is assumed that there is no significant change in composition between frames, the results obtained by the first detector 112 and the region integration unit 113 are the same as those in the first frame, and the five integrated regions A to E are acquired. Here, since the regions B, C, and D have been determined to be face regions in the first frame, they are not selected by the region selector 114. Therefore, the region selector 114 selects the region E. The second detector 115 performs the face detection process using a deep learning algorithm on the integrated region E, and determines that the integrated region E is not a face region.

As a result of the above-described processes, in the third frame, the integrated regions B, C, and D are determined to be face regions.

FIG. 11D is a diagram illustrating a process for the fourth frame. This time as well, the faces existing in the regions B, C, and D are the targets of the tracking process by the face tracking unit 116. The face tracking unit 116 detects faces from positions almost similar to those of the third frame.

An example in which only three faces are included in an image has been described here. However, even when more faces are included, all faces can be finally detected by the second detector 115 and then can be tracked by the face tracking unit 116 by repeating the above-described processes.

It has been described that only the integrated region E is selected in the third frame, but the integrated region A may also be selected. Similarly, the integrated region E may be selected even in the fourth and following frames. In the description of FIG. 11, the first detector 112 always detects that the regions A and E are face regions. However, since the integrated regions A and E are non-face regions, it can be expected that the first detector 112 will not detect them as face regions some time.

Effect of Embodiment

Comparing the face detection process of Haar-like features+adaboost learning with the face detection process of deep learning (CNN), the latter is more accurate but requires more calculation amount. Therefore, in a computer having relatively small computing resources such as a mobile information terminal, the process time becomes very long if deep-learning face detection is performed on the entire input image. On the other hand, in the embodiment, first, regions in which a face is likely to exist are narrowed down by using a simplified face detection process, candidate regions are integrated, and deep-learning face detection is performed only on the integrated region. As a result, both detection accuracy and detection speed can be expected, but when the number of faces included in an image is large, the amount of calculation may increase and the process may not be in time. Therefore, by selecting regions to be targets of deep-learning face detection from (narrowing down) integrated regions, fast processing can be performed regardless of the number of faces included in the image.

Limitation of the number of integrated regions on which deep-learning face detection is performed may suppress the process load, but limits the number of faces that can be detected at one time. Therefore, this method is applied to a moving image to detect already detected faces by the face tracking process and undetected faces by the deep-learning face detection process. Thus, all faces in the image can be detected in a few frames.

First Modification

In the above-described embodiment, the region selector 114 excludes the integrated regions at the positions of the face regions detected in the previous frame from the selection targets, so that the integrated regions at the positions of the faces detected in the previous frame are prevented from being targets of the detection process by the second detector 115. However, the same effect can be achieved by a method other than the method described above.

Figure 12:
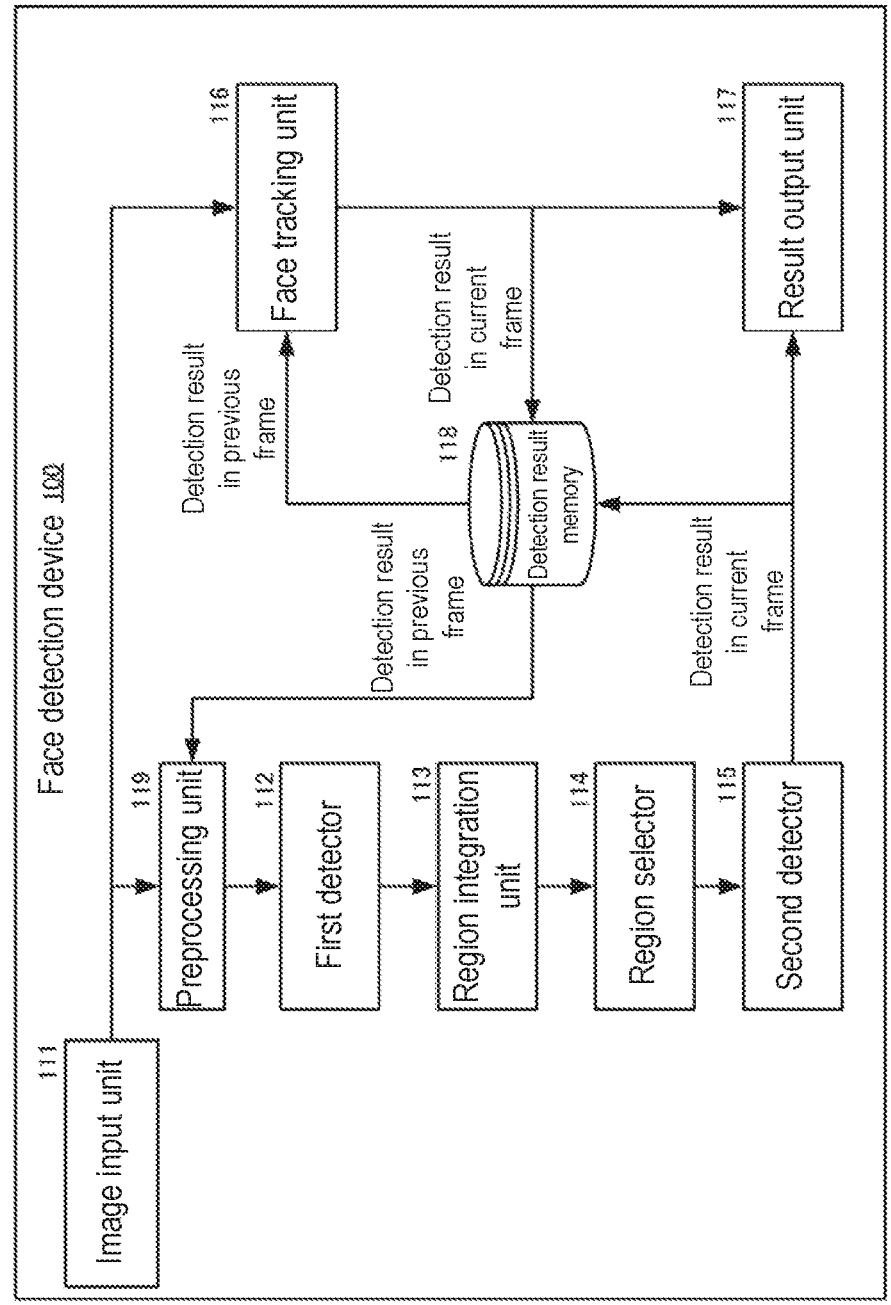
FIG. 12 is a block diagram illustrating a configuration of a face detection device according to a modification of the first embodiment.

FIG. 12 is a diagram illustrating a configuration of a face detection device 100 according to the present modification. The face detection device 100 is different from that in the first embodiment in that a preprocessing unit 119 is provided upstream of the first detector 112. The preprocessing unit 119 refers to the detection result memory 118 to process a region in which a face has been detected in the previous frame so that the first detector 112 does not detect the face in the region.

Figure 13A:
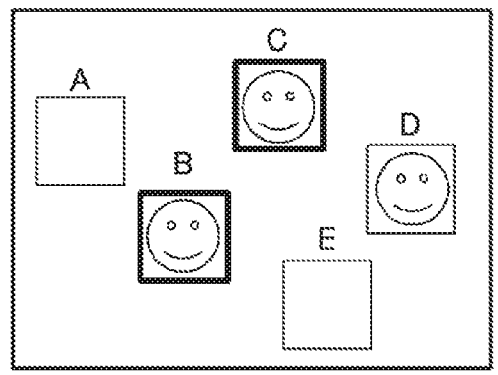
FIGS. 13A and 13B are views for describing an example of a preprocess according to a modification of the first embodiment.
Figure 13B:
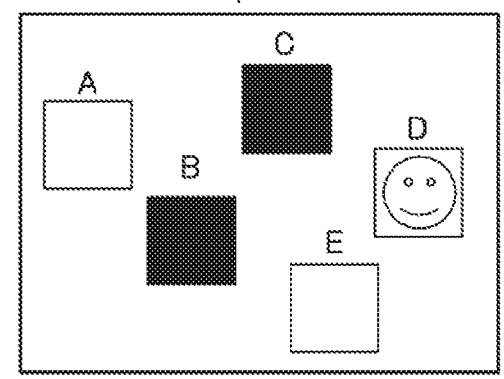

Description will be given with reference to FIGS. 13A and 13B. For example, as illustrated in FIG. 13A, it is assumed that faces are detected in the integrated regions B and C in an image of the first frame. In this case, as illustrated in FIG. 13B, a process of filling the positions of the face regions (integrated regions B and C) with a single-color pattern is performed as a preprocess on an image of the second frame. The face regions may be replaced with pattern images other than the single-color pattern, or filtering process may be performed on the face regions. In addition, a region to be processed does not have to be the entire face region, and may be only a part of the face region as long as the face region is not detected as a face.

Thus, a face candidate region detected by the first detector 112, and then an integrated region determined by the region integration unit 113 do not include a region having been determined to be a face region in the previous frame. Therefore, in the present modification, the region selector 114 does not need to refer to the detection result in the previous frame, and may select integrated regions simply according to the evaluation values.

Second Modification

The region selector 114 may be configured not to select, when selecting an integrated regions, integrated regions having been determined not to be face regions by the second detector 115 in the previous frame, using a detection result in the previous frame that is obtained by the second detector 115 and that indicates that the regions are not faces. This is because the detection accuracy of face detection by the second detector 115 is high, and thus it is highly possible that no face is included in that region.

However, it is not preferable not to continuously select regions once determined not to be a face, assuming that the composition changes with time. Therefore, it is preferable that the region selector 114 do not select such regions only during a few frames when the second detector 115 determines that the regions are not faces. Alternatively, the region selector 114 may be configured not to select a region that has been determined not to be a face region in the previous frame, and that has a degree of similarity in image equal to or more than a threshold.

The process described here is not necessarily performed. This is because it is unlikely that the first detector 112 continues to detect a region to be a face if the region is not a face. Another reason is that even if the first detector 112 detects a region that is not a face, the reliability is low and the priority to be selected by the region selector is lowered. Still another reason is that even if the region selector 114 selects such a region as a process target of the second detector 115, the number of regions processed by the second detector 115 is limited, and thus it is avoided that the process load causes a problem.

Other Embodiments

In the above description, the first detector 112 is a detector that uses Haar-like features and adaboost learning, but the present invention is not limited to this configuration. For example, as a feature, any feature such as Histgram of Gradient (HoG) feature, SIFT feature, SURF feature, Sparse feature, and the like can be used. Further, as a learning method, any learning method such as a boosting method other than adaboost, a Support Vector Machine (SVM), neural network, or decision tree learning can be used. In addition to those, feature quantity extraction using an integral image, a discriminator using a cascade structure, and the like can be used.

Further, the second detector 115 is not limited to CNN, but may be a detector using any method such as Recurrent Neural Network (RNN), Stacked Auto Encoder (SAE), Deep Belief Network (DBN), and Deep Neural Network (DNN). The second detector 115 does not have to be a detector using deep learning. However, it is desirable that the detection algorithm of the second detector 115 be capable of more highly accurate detection and use a larger calculation amount than the detection algorithm of the first detector 112.

Note that the algorithm of the first detector 112 need not be a method other than deep learning and the algorithm of the second detector 115 need not be a deep learning method as long as the respective methods are different from each other. The two algorithms may both be non-deep learning algorithms or deep learning algorithms. For example, the algorithm of the first detector 112 may be a method that uses Haar features and a Boosting learning method, and the algorithm of the second detector 115 may be a method that uses HoG features and a Boosting learning method. Alternatively, the algorithm of the first detector 112 may be CNN and the algorithm of the second detector 115 may be DNN.

Although the detection target object is a face in the above description, the detection target object may be any object. That is, the present invention can be applied to an object detection device that detects any predetermined object. A human body, a specific animal, an automobile, and a specific product, are only a few examples of a detection target object.

Further, in the above description, the object detection device is mounted on a mobile information terminal such as a smartphone, but it may be mounted on any device. The object detection device according to the present invention can be mounted on any information processing device (computer) such as a desktop computer, a notebook computer, a slate computer, a smartphone, a mobile phone, a digital camera, and a digital video camera. However, the effect of the present invention becomes more prominent when the object detection device is mounted on a device having relatively small computing resources.

SUPPLEMENTARY NOTE

An object detection device (10, 100) for detecting a target object from an image, including:

a first detection unit (12, 112) configured to detect a plurality of candidate regions in which the target object exists from the image;

a region integration unit (13,113) configured to determine one or more integrated regions based on the plurality of candidate regions detected by the first detection unit;

a selection unit (14, 114) configured to select at least a part of the integrated regions; and a second detection unit (15, 115) configured to detect the target object from the selected integrated region using a detection algorithm different from a detection algorithm used by the first detection unit.

DESCRIPTION OF SYMBOLS

100 face detection device
111 image input unit
112 first detector
113 region integration unit
114 region selector
115 second detector
116 face tracking unit
117 result output unit
118 detection result memory

The invention claimed is:

1. An object detection device for detecting a target object from an image, the object detection device comprising a processor configured with a program to perform operations comprising:

operation as a first detection unit configured to detect, from the image, a plurality of candidate regions in which at least a portion of the target object exists using a first detection algorithm having a first computation speed and a first computation load;

operation as a region integration unit configured to determine one or more integrated regions based on the plurality of candidate regions detected by the first detection unit, wherein operation as the region integration unit comprises:

selecting a representative region of the plurality of candidate regions based on one or more considerations comprising: a highest reliability among the plurality of candidate regions; a size of the region; and a direction of the target object in the region;

for each of the plurality of candidate regions, determining whether a relation score between representative region and the respective candidate region is greater than or equal to a threshold;

designating the respective candidate region as a related region based on determining that the relation score for the respective candidate region is greater than or equal to the threshold; and integrating the representative region and the one or more related regions to determine an integrated region of the one or more integrated regions;

operation as a selection unit configured to select at least one of the one or more integrated regions as a target integrated region; and operation as a second detection unit configured to detect the target object from the selected target integrated region using a second detection algorithm different from the first detection algorithm used by the first detection unit, the second detection algorithm having a second computation speed lower than the first computation speed and a second computational load higher than the first computational load.

2. The object detection device according to claim 1, wherein the image comprises a moving image, the processor is configured with the program to perform operations further comprising operation as a tracking unit configured to track the target object, wherein a result of operation as the second detection unit or operation as the tracking unit is defined as a final detection result in each frame, in a current frame, operation as the tracking unit comprises tracking the object confirmed to be the target object in a previous frame, and the selected at least one of the one or more integrated regions is at a position other than a region confirmed to be the target object in the previous frame.

3. The object detection device according to claim 2, wherein operation as the selection unit comprises selecting a predetermined number of integrated regions from the one or more integrated regions having reliabilities equal to or more than a threshold, the selected integrated regions being at positions other than the region confirmed to be the target object in the previous frame.

4. The object detection device according to claim 2, wherein operation as the selection unit comprises selecting a predetermined number of integrated regions having larger sizes from ones of the one or more integrated regions at positions other than the region confirmed to be the target object in the previous frame.

5. The object detection device according to claim 2, wherein operation as the selection unit comprises selecting the at least one integrated region from the one or more integrated regions in consideration of a detection score by the second detection unit in the previous frame.

6. The object detection device according to claim 2, wherein operation as the selection unit comprises selecting the at least one integrated region from the one or more integrated regions in consideration of a direction of the target object.

7. The object detection device according to claim 2 wherein the processor is configured with the program to perform operations further comprising operation as a preprocessing unit configured to perform a preprocess on a region in a current frame image corresponding to the region of the object confirmed to be the target object in the previous frame, the preprocess causing the region not to be detected as the object, wherein
operation as the first detection unit comprises detecting the target object from the preprocessed current frame image to prevent the region confirmed to be the target object in the previous frame image from being an integrated region.

8. The object detection device according to claim 2 wherein the processor is configured with the program to perform operations further comprising operation as a memory unit that stores a position of the region confirmed to be the target object in the previous frame image, wherein
operation as the selection unit comprises excluding an integrated region at a position stored in the memory unit from selection targets.

9. The object detection device according to claim 1, wherein a calculation amount of the detection algorithm of the second detection unit is larger than that of the detection algorithm of the first detection unit.

10. The object detection device according to claim 1, wherein the target object comprises a human face or a human body.

11. An object detection method for detecting a target object from an image, being performed by a computer and comprising:
first detecting, from the image, a plurality of candidate regions in which at least a portion of the target object exists using a first detection algorithm having a first computation speed and a first computation load;
determining one or more integrated regions based on the plurality of candidate regions detected in the first detecting, wherein determining one or more integrated regions comprises:
selecting a representative region of the plurality of candidate regions based on one or more considerations comprising: a highest reliability among the plurality of candidate regions; a size of the region; and a direction of the target object in the region;
for each of the plurality of candidate regions, determining whether a relation score between representative region and the respective candidate region is greater than or equal to a threshold;
designating the respective candidate region as a related region based on determining that the relation score for the respective candidate region is greater than or equal to the threshold; and
integrating the representative region and the one or more related regions to determine an integrated region of the one or more integrated regions;
selecting least one of the one or more integrated regions as a target integrated region; and
second detecting the target object from the selected target integrated region using a second detection algorithm different from the first detection algorithm used in the first detecting, the second detection algorithm having a second computation speed lower than the first computation speed and a second computational load higher than the first computational load.

12. The object detection method according to claim 11, wherein
the image comprises a moving image,
the object detection method further comprises tracking a target object,
a result of the second detecting or the tracking is defined as a final detection result in each frame,
in the tracking, the object confirmed to be the target object in a previous frame is tracked in a current frame, and
in the selecting, the selected integrated region is at a position other than a region confirmed to be the target object in the previous frame.

13. The object detection method according to claim 12, wherein in the selecting, a predetermined number of the one or more integrated regions having higher evaluation values based on at least one of reliabilities, sizes, or directions of target objects are selected from integrated regions at positions other than the region confirmed to be the target object in the previous frame.

14. The object detection method according to claim 11 further comprising performing a preprocess on a region in a current frame image corresponding to a region of an object confirmed to be the target object in a previous frame, the preprocess causing the region not to be detected as the object, wherein
in the first detecting, the target object is detected from the preprocessed current frame image to prevent a region confirmed to be the target object in the previous frame image from being an integrated region.

15. The object detection method according to claim 11 further comprising a memory step of storing a position of a region confirmed to be the target object in a previous frame image, wherein
in the selecting, an integrated region at a position stored in the memory step is excluded from selection targets.

16. A non-transitory computer readable storage medium storing a program that, when executed by a computer, causes the computer to perform the method according to claim 11.

* * * * *